Jan 6, 1931.  J. NULL  1,787,544
POULTRY FOUNTAIN
Filed March 25, 1929  2 Sheets-Sheet 1

Jesse Null, INVENTOR
BY Victor J. Evans
ATTORNEY

Jan 6, 1931.  J. NULL  1,787,544
POULTRY FOUNTAIN
Filed March 25, 1929   2 Sheets-Sheet 2
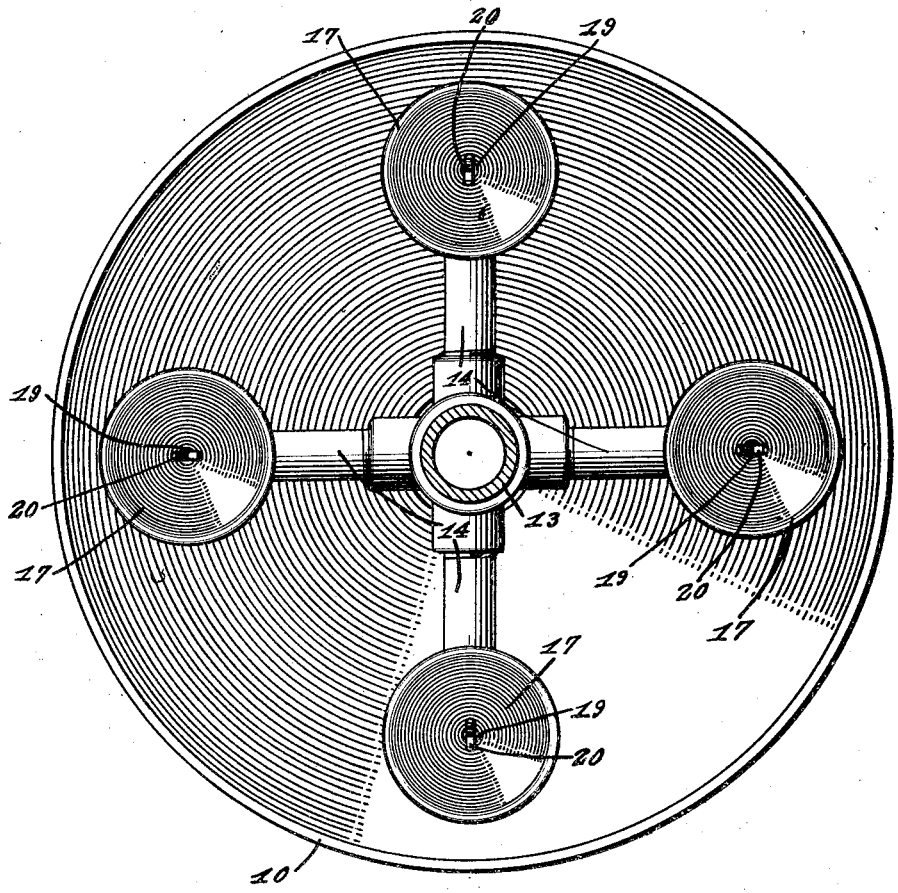
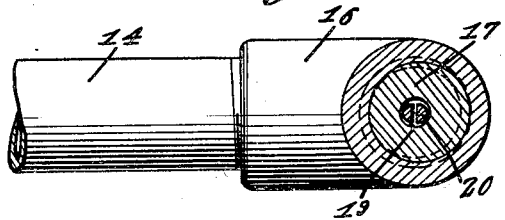
Jesse Null, INVENTOR
BY Victor J. Evans
ATTORNEY Patented Jan. 6, 1931

1,787,544

UNITED STATES PATENT OFFICE

JESSE NULL, OF ARCADIA, CALIFORNIA

POULTRY FOUNTAIN

Application filed March 25, 1929. Serial No. 349,748.

This invention relates to poultry fountains, an object being to provide a simple device of an inexpensive character, by means of which fresh drinking water may be supplied for poultry, birds, etc.

To this end, the invention includes a housing which is substantially funnel shaped and within which is positioned a number of drinking cups having communication with a source of water supply, so that fresh water may be at all times supplied to the cups and the overflow therefrom directed by the housing into a suitable drain.

The invention further includes novel means for controlling communication between the cups and the source of water supply, which retards the entrance of water into the cups so that the water will slowly pass from the supply pipes into the cups, while the passage of sand, dirt and other foreign substances will be prevented from passing from the cups into the supply pipe.

With the above and other objects in view, the invention further includes the following novel features and details of construction, to be hereinafter more fully described, illustrated in the accompanying drawings and pointed out in the appended claims.

In the drawings:—

Figure 2 is a section taken substantially on the line 2—2 of Figure 1.

Figure 3 is an enlarged fragmentary section on the line 3—3 of Figure 1.

Figure 1:
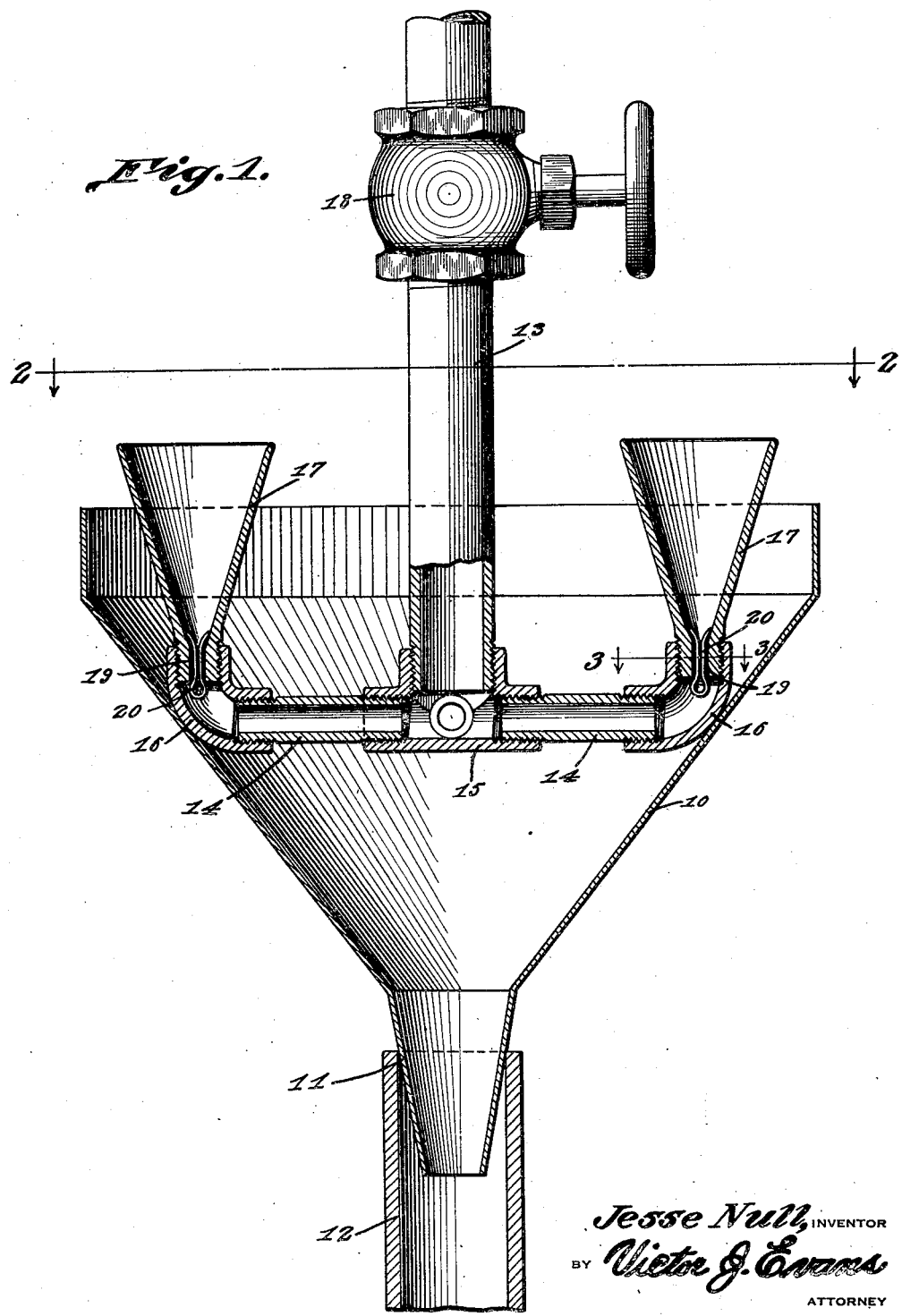
Figure 1 is a sectional view of the invention.

Referring to the drawings in detail wherein like characters of reference denote corresponding parts, the reference character 10 indicates a housing which is preferably funnel shaped and has its lower discharge end 11 positioned within a vertically disposed drain pipe 12, so that this pipe may support the housing. Extending into the housing is a water supply pipe 13 and communicating with the lower end of this pipe are radially disposed branch pipes 14. Any number of branch pipes 14 may be employed. The inner ends of the pipes 14 are connected with the lower end of the pipe 13 by means of a connection 15, while the outer ends of these branch pipes have connected thereto an elbow 16 which serves to connect the pipes 14 with drinking cups 17.

The cups 17 are of tapered formation and have their lower restricted ends secured within the elbows 16, while their upper ends extend above the upper edge of the housing 10.

Water from the pipe 13 passes to the cups 17 through to the branch pipes 14 and overflows into the housing 10, the latter directing the overflow into the drain 12. A valve 18 may be connected in the pipe 13 to regulate the supply of water.

The lower ends of the cups 17 are provided with restricted openings 19 whereby communication between the cups and the branch pipes 14 is provided. In order to retard flow of water from the pipes 14 into the cups so that the water will slowly enter the cups, the openings 19 have secured therein cotter pins 20. These pins in addition to restricting the flow of water into the cups also prevent sand, dirt, and other foreign matter from passing from the cups into the pipes.

It will be seen from the foregoing description and accompanying drawings that the invention provides a simple poultry fountain which is inexpensive of construction and which eliminates valves, floats and the like. In addition, the invention eliminates the use of troughs and pans which quickly become slimy and unsanitary. The invention provides a fountain which will be kept in a clean and sanitary condition by the constant and even flow of water therethrough, while all of the parts of the fountain are readily accessible should it become necessary to clean or replace any part of the device.

The invention is susceptible of various changes in its form, proportions and minor details of construction and the right is herein reserved to make such changes as properly fall within the scope of the appended claims.

Having described the invention what is claimed is:—

1. In a poultry fountain, a vertically disposed drain pipe open at the top, a funnel-shaped housing having its lower open end disposed within the upper open end of the drain pipe, a water supply pipe extending into the top of the funnel-shaped housing, branch pipes extending radially from the lower end of the water supply pipe, cups carried by the branch pipes and having openings in their bottoms to provide communication with said branch pipes, and cotter pins secured within the openings to restrict the flow of water into the cups and prevent the passage of foreign matter.

2. In a poultry fountain, a water supply pipe, a funnel-shaped cup supported by and having its lower restricted end in communication with said pipe, a housing extending around the cup and having a discharge outlet, and a cotter pin located within the restricted end of the cup, said pin having a head of greater width than the diameter of the passage in the restricted end of the cup and bearing against said end with the free ends of the pin separated and extending oppositely outward against the diverging walls of the cup to retain the pin in position.

In testimony whereof I affix my signature.

JESSE NULL.